US009403495B2

United States Patent
Gotou et al.

(10) Patent No.: US 9,403,495 B2
(45) Date of Patent: Aug. 2, 2016

(54) WIRE HARNESS AND METHOD OF MANUFACTURING THE SAME

(75) Inventors: Hiroki Gotou, Kosai (JP); Toshio Okazaki, Kosai (JP)

(73) Assignee: Yazaki Corporation, Tokyo (JP)

( * ) Notice: Subject to any disclaimer, the term of this patent is extended or adjusted under 35 U.S.C. 154(b) by 337 days.

(21) Appl. No.: 13/822,824

(22) PCT Filed: Jul. 26, 2011

(86) PCT No.: PCT/JP2011/066905
§ 371 (c)(1),
(2), (4) Date: Mar. 13, 2013

(87) PCT Pub. No.: WO2012/043037
PCT Pub. Date: Apr. 5, 2012

(65) Prior Publication Data
US 2013/0180776 A1    Jul. 18, 2013

(30) Foreign Application Priority Data

Oct. 1, 2010  (JP) .................................. 2010-223683

(51) Int. Cl.
*B60R 16/02*      (2006.01)
*H02G 3/04*       (2006.01)
*H01B 13/012*     (2006.01)

(52) U.S. Cl.
CPC ...... *B60R 16/0215* (2013.01); *H01B 13/01263* (2013.01); *H02G 3/0468* (2013.01); *Y10T 29/49117* (2015.01)

(58) Field of Classification Search
CPC . H02G 3/0468; H02G 3/0475; H02G 3/0481; H02G 3/04; B60R 16/0215; B60R 16/0207
See application file for complete search history.

(56) References Cited

U.S. PATENT DOCUMENTS

| 6,227,578 | B1 * | 5/2001 | Fukui | ...................... | F16L 11/15 285/179 |
| 2007/0140759 | A1 * | 6/2007 | Ishibe | ................ | G03G 15/2064 399/329 |
| 2007/0197097 | A1 * | 8/2007 | Sakaguchi | ............. | H01R 9/034 439/607.41 |

(Continued)

FOREIGN PATENT DOCUMENTS

| EP | 1890071 A2 * | 2/2008 | ............ F16L 43/008 |
| EP | 1890071 A2   | 2/2008 | |

(Continued)

OTHER PUBLICATIONS

International Search Report dated Sep. 20, 2011, issued for PCT/JP2011/066905.

(Continued)

*Primary Examiner* — Zachary M Pape
*Assistant Examiner* — Douglas Burtner
(74) *Attorney, Agent, or Firm* — Locke Lord LLP; James E. Armstrong, IV (57) ABSTRACT

There are provided a wire harness and a manufacturing method thereof which can reduce number of components and which does not require an electric wire to be formed longer than necessary. A wire harness includes an electric wire and a tubular corrugated tube made of synthetic resin and arranged to receive the electric wire to protect the electric wire. The corrugated tube is bent at an appropriate section when wired on an automobile. The corrugated tube includes recessed grooves and protrusions arranged alternately along a longitudinal direction. The adjacent protrusions of the appropriate section on the inward side are attached to each other by welding. The appropriate section is bent in a non-restorable fashion in a direction in which the appropriate section is bent when wired in the automobile.

3 Claims, 8 Drawing Sheets

(56) References Cited

U.S. PATENT DOCUMENTS

2009/0089998 A1* 4/2009 Varkey ............... H01B 13/24
  29/825
2011/0072658 A1* 3/2011 Dye ............... H01B 13/0214
  29/882

FOREIGN PATENT DOCUMENTS

| JP | 11-190486 A | | 7/1999 |
|---|---|---|---|
| JP | 11-203945 A | | 7/1999 |
| JP | 2009-143326 A | | 7/2009 |
| JP | 2009143326 A | * | 7/2009 |

OTHER PUBLICATIONS

Supplementary European Search Report dated Feb. 12, 2014, issued for the European patent application No. 11828598.0.

* cited by examiner

WIRE HARNESS AND METHOD OF MANUFACTURING THE SAME

TECHNICAL FIELD

The present invention relates to a wire harness to be wired on an automobile and a method of manufacturing the wire harness.

BACKGROUND ART

An automobile is mounted with various electronic devices. Thus, a wire harness is wired in the automobile for transmitting desired power and signal to these electronic devices (refer to Patent Literature 1, for example). The wire harness shown for example in Patent Literature 1 includes a plurality of electric wires, a connector attached to a terminal of the electric wire and arranged to be fitted to the electronic device, and a harness tube arranged to receive the electric wire to protect the electric wire.

The wire harness of this type is wired in the automobile along a vehicle body frame of the automobile, thus is formed into a desired three-dimensional shape by bending an appropriate section of the wire harness in a desired direction along a surface of the vehicle body panel.

On the other hand, the wire harness described above is assembled by suitably attaching a sub-harness, the above-described connector and the harness tube on a flat plate with a wire. Thus, the wire harness described above is obtained by bending the wire harness at the above-mentioned appropriate section in two-dimension, i.e. on a predetermined plane.

CITATION LIST

Patent Literature

Patent Literature 1: Japan Patent Application Publication No. H11-203945

SUMMARY OF INVENTION

Technical Problem

The conventional wire harness such as the one shown in the above-mentioned Patent Literature 1 is bent at the above-mentioned appropriate section on a predetermine plane. Thus, the direction of bending of this appropriate section is different from the direction of bending of the appropriate section when actually wired in the automobile. For this reason, for the conventional wire harness, the above-described electric wire is arranged slightly longer than the minimum-required desired length, and the electric wire is bent again when being actually wired in the automobile so that the connector can be fitted reliably to the desired electronic device. Furthermore, since the direction of bending of the appropriate section of the wire harness is different from the direction of bending of the appropriate section when actually wired in the automobile, the conventional wire harness requires many wiring clips when fixing the wire harness on the vehicle body panel of the automobile and requires many protectors for positioning the electric wire along a wiring path, causing an increase in number of components.

Therefore, an object of the present invention is to provide a wire harness and a method of manufacturing the wire harness which can prevent an increase in number of components and which can avoid making an electric wire longer than necessary.

Solution to Problem

In order to solve the problem and achieve the object, the present invention provides, in a first aspect, a wire harness including at least one electric wire; and a tubular protection member made of synthetic resin and arranged to receive the at least one electric wire to protect the electric wire, the protection member being arranged to be bent at an appropriate section when wired on an automobile, wherein the protection member has an outer surface including circumferentially-extending recessed grooves and circumferentially-extending protrusions which are arranged alternately along a longitudinal direction of the protection member so as to form the outer surface of the protection member into a concertina shape, wherein the electric wire is received in the protection member in a linear state, and the adjacent protrusions of the appropriate section of the protection member in the linear state on an inward side with respect to a direction in which the appropriate section is bent when wired in the automobile are attached to each other, by which the appropriate section of the protection member is bent in said direction in a non-restorable fashion.

The present invention provides, in a second aspect, the wire harness described in the first aspect wherein the adjacent protrusions of the appropriate section are welded together, by which the protection member is bent in said direction in a non-restorable fashion.

The present invention provides, in a third aspect, the wire harness described in the first aspect wherein the adjacent protrusions of the appropriate section are adhered to each other using an adhesive, by which the protection member is bent in said direction in a non-restorable fashion.

The present invention provides, in a forth aspect, a method for manufacturing a wire harness, the wire harness having at least one electric wire and a tubular protection member made of synthetic resin and arranged to receive the at least one electric wire to protect the electric wire, wherein the protection member is arranged to be bent at an appropriate section when wired on an automobile, and wherein the protection member has an outer surface including circumferentially-extending recessed grooves and circumferentially-extending protrusions which are arranged alternately along a longitudinal direction of the protection member so as to form the outer surface of the protection member into a concertina shape, the method including steps of: receiving the electric wire in the protection member in a linear state; and attaching the adjacent protrusions of the appropriate section of the protection member in the linear state on an inward side with respect to a direction in which the appropriate section is bent when wired in the automobile to each other, thereby bending the appropriate section of the protection member in said direction in a non-restorable fashion.

The present invention provides, in a fifth aspect, the method described in the forth aspect, wherein the step of attaching the adjacent protrusions includes welding the adjacent protrusions on the appropriate section, thereby bending the protection member in said direction in a non-restorable fashion.

The present invention provides, in a sixth aspect, the method described in the forth aspect, wherein the step of attaching together the protrusions includes adhering the adjacent protrusions on the appropriate section using an adhesive, thereby bending the protection member in said direction in a non-restorable fashion.

According to the wire harness of the present invention described in the first aspect of the present invention, the appropriate section of the protection member, which is arranged to be bent when wired in the automobile, is bent in a non-restorable fashion in a direction in which the appropriate section is bent when wired in the automobile. Thus, there is almost no need to perform another bending when wiring the wire harness in the automobile.

Furthermore, since the adjacent protrusions of the appropriate section on the inward side with respect to said direction are attached to each other, the appropriate section of the protection member can reliably be bent in said direction in a reliable manner.

According to the wire harness of the present invention described in the second aspect of the present invention, since the adjacent protrusions of the appropriate section of the protection member on the inward side with respect to said direction are welded together, the appropriate section of the protection member can reliably be bent in said direction in a non-restorable fashion.

According to the wire harness of the present invention described in the third aspect of the present invention, since the adjacent protrusions of the appropriate section of the protection member on the inward side with respect to said direction are adhered to each other using the adhesive, the appropriate section of the protection member can reliably be bent in said direction in a non-restorable fashion.

According to the method for manufacturing the wire harness of the present invention described in the forth aspect of the present invention, the appropriate section of the protection member which is bent when wired in the automobile is bent in a non-restorable fashion in the direction in which the appropriate section is bent when wired in the automobile. Thus, there is almost no need to perform another bending when wiring the wire harness in the automobile.

Furthermore, since the adjacent protrusions of the appropriate section of the protection member on the inward side with respect to said direction are attached to each other, the appropriate section of the protection member can reliably be bent in said direction in a non-restorable fashion.

According to the method of the present invention described in the fifth aspect of the present invention, since the adjacent protrusions of the appropriate section of the protection member on the inward side with respect to said direction are welded together, the appropriate section of the protection member can reliably be bent in said direction in a non-restorable fashion.

According to the method of the present invention described in the sixth aspect of the present invention, since the adjacent protrusions of the appropriate section of the protection member on the inward side with respect to said direction are adhered to each other using the adhesive, the appropriate section of the protection member can reliably be bent in said direction in a non-restorable fashion.

Advantageous Effects of Invention

As explained above, according to the first and forth aspects of the present invention, there is almost no need to perform another bending when wiring the wire harness in the automobile. Thus, the number of wiring clips and protectors can be reduced, thereby preventing an increase in number of components. Furthermore, since there is almost no need to perform another bending when wiring the wire harness in the automobile, there is no need to form the electric wire longer than necessary.

Furthermore, since the appropriate section of the protection member can reliably be bent in said direction in a non-restorable fashion by attaching the adjacent protrusions to each other, there is no need to form the electric wire longer than necessary, and an increase in number of components can be prevented in a reliable manner.

According to the second and fifth aspects of the present invention, since the appropriate section of the protection member can reliably be bent in said direction in a non-restorable fashion by welding the adjacent protrusions to each other, there is no need to form the electric wire longer than necessary, and an increase in number of components can be prevented in a reliable manner.

According to the third and sixth aspect of the present invention, since the appropriate section of the protection member can reliably be bent in said direction in a non-restorable fashion by adhering the adjacent protrusions to each other, there is no need to form the electric wire longer than necessary, and an increase in number of components can be prevented in a reliable manner.

DESCRIPTION OF EMBODIMENTS

In the following, a wire harness and a manufacturing method of the wire harness according to a first embodiment of the present invention are explained in reference to FIGS. 1 through 7. A wire harness 10 according to the first embodiment of the present invention is arranged to be wired on an automobile 1 (shown in FIG. 1) such as a hybrid vehicle and an electric vehicle which is driven by a driving force of a motor 3. In the shown example, the automobile 1 is a hybrid vehicle.

Figure 1:
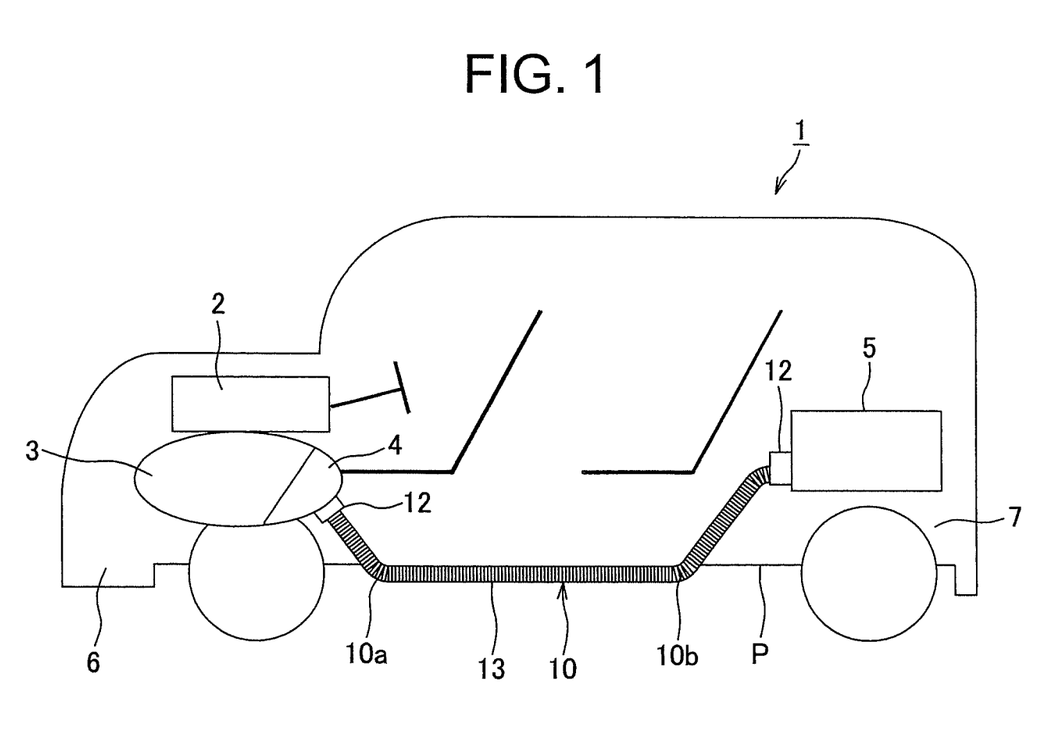
FIG. 1 is an illustration showing a structure of an automobile having a wire harness according to a first embodiment of the present invention.
Figure 2:
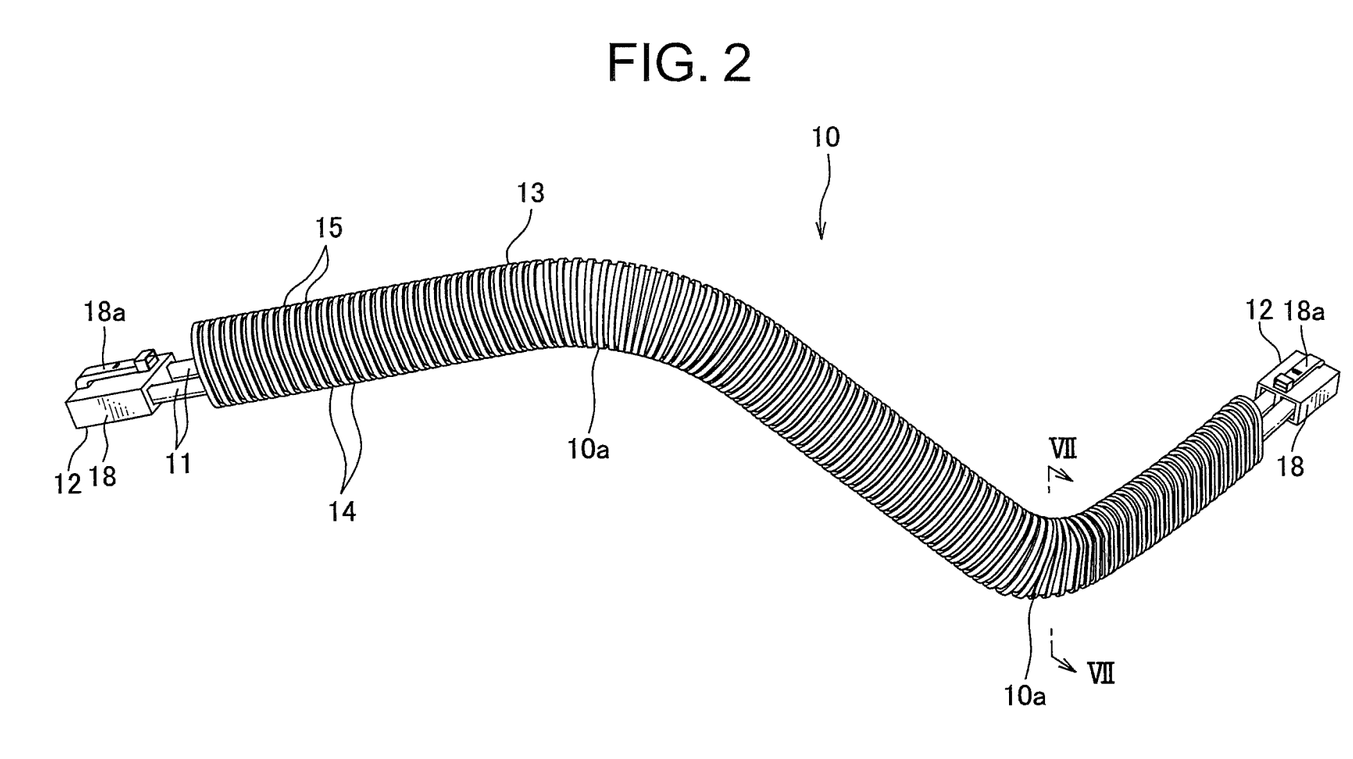
FIG. 2 is a perspective view of the wire harness shown in FIG. 1.

The automobile 1 is a vehicle which is driven by a drive force produced by two drive sources, an engine 2 and the motor 3. The motor 3 is supplied with power from a battery 5 as an electronic device via an inverter 4 as an electronic device. In the shown example, the engine 2, the motor 3 and the inverter 4 are provided to a vehicle inner front side 6 of the automobile 1, and the battery 5 is provided to a vehicle inner rear side 7.

The wire harness 10 according to this embodiment is arranged to electrically-connect the battery 5 and the inverter 4 to each other to supply power from the battery 5 to the inverter 4 or from the inverter 4 to the battery 5. The wire harness 10 is wired on a lower face of a vehicle frame P as a vehicle panel. When wiring the wire harness 10 on the lower face of the vehicle frame P, the wire harness 10 is bent at an appropriate section 10a (there are two appropriate sections in the shown example) in a desired direction (i.e. a direction in which the wire harness is bent when wired in theomobile 1).

As shown in FIG. 1, the wire harness 10 includes at least one electric wire 11 (there are two electric wires in the shown example), two connectors 12 and a harness tube (herein after called the corrugated tube) 13 as a tubular protection member.

Figure 6:
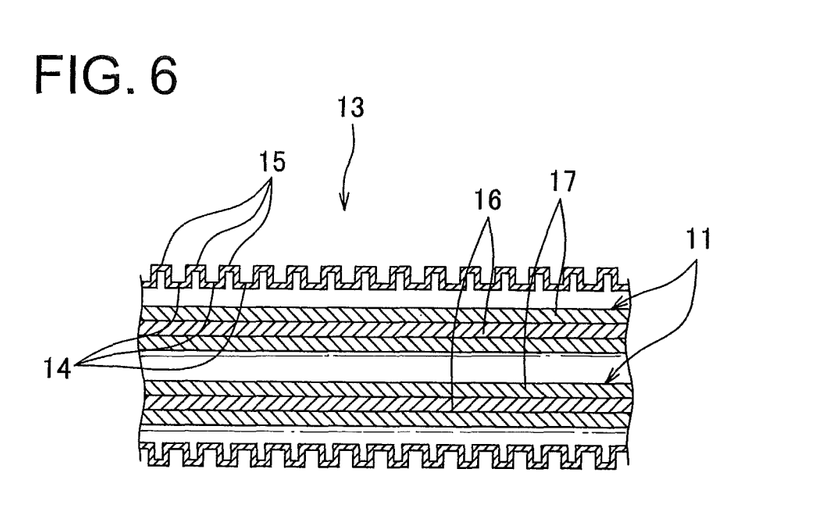
FIG. 6 is a cross-sectional view taken along a line VI-VI shown in FIG. 4.
Figure 7:
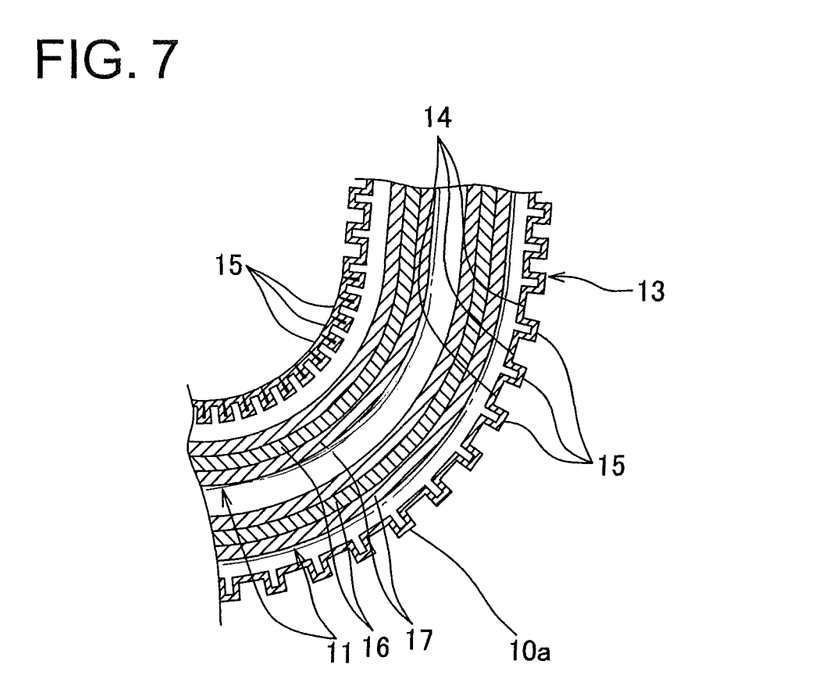
FIG. 7 is a cross-sectional view taken along a line VII-VII shown in FIG. 2.
Figure 9:
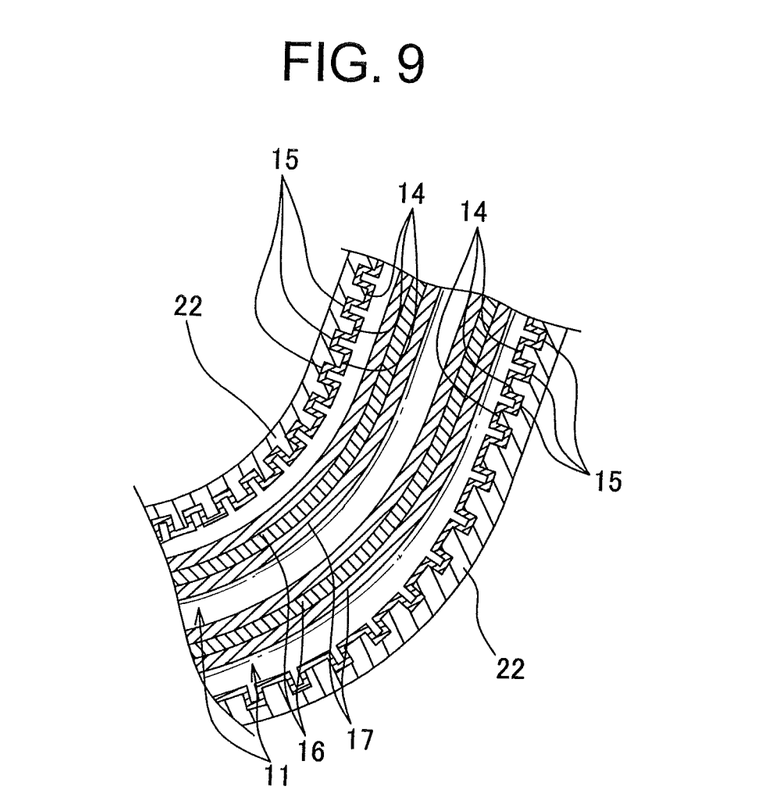
FIG. 9 is a cross-sectional view taken along a line IX-IX shown in FIG. 8.

As shown in FIGS. 6, 7 and 9, the electric wire 11 includes a conductive core wire 16 and an insulating cover portion 17. The core wire 16 is formed by twisting a plurality of conductive element wires. The element wires constituting the core wire 16 is made of conductive metal such as copper or copper alloy. Alternatively, the core wire 16 may be constituted of one element wire. The cover portion 17 is made of synthetic resin such as polyvinyl chloride. The cover portion 17 is arranged to cover the core wire 16.

Figure 3:
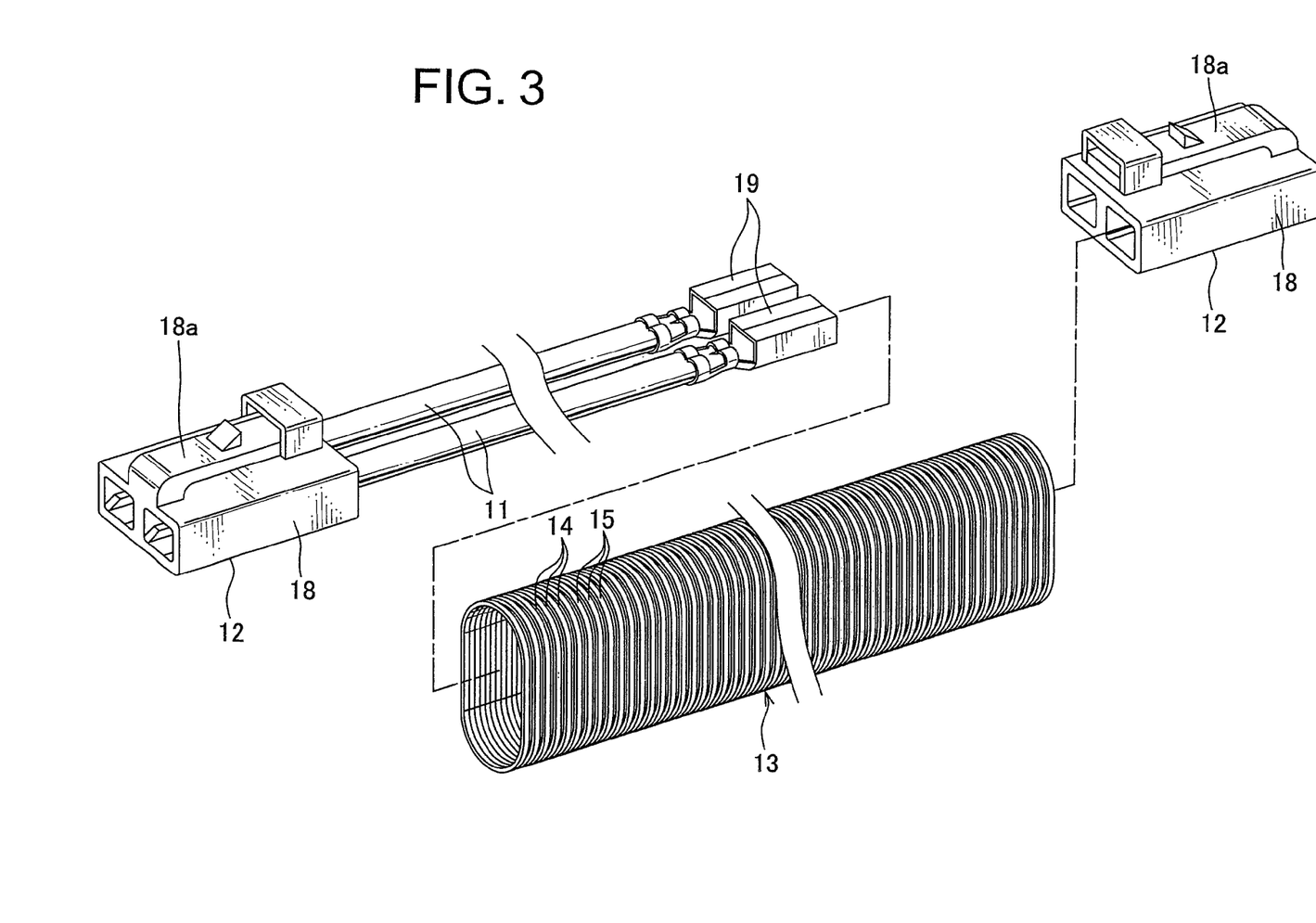
FIG. 3 is a perspective view showing an electric wire and a corrugated tube in a linear state of the wire harness shown in FIG. 1.

As shown in FIG. 3, the connector 12 includes a connector housing 18 and a terminal clamp 19. The connector housing 18 is made of insulating synthetic resin and is formed into a box-like shape. The connector housing 18 is arranged to receive the terminal clamp 19. Furthermore, the connector housing 18 includes a lock arm 18a arranged to fit to a connector provided to the battery 5 and the inverter 4.

The terminal clamp 19 is made of conductive metal plate and is attached to an end of the electric wire 11. The terminal clamp 19 is electrically-connected to the core wire 16, i.e. the electric wire, and is connected to a terminal clamp of the connector provided to the battery 5 and the inverter 4.

The corrugated tube 13 is made of thermoplastic resin as an insulating synthetic resin. The corrugated tube 13 is formed into a tubular shape having an elliptical cross section. Furthermore, as shown in FIG. 6, the corrugated tube 13 includes a recessed groove 14 extending in a circumferential direction and a protrusion 15 extending in the circumferential direction, the recessed grooves 14 and the protrusions 15 being arranged alternately along a longitudinal direction so as to form an outer surface of the corrugated tube 13 into a concertina shape. The thickness of the corrugated tube 13 is entirely formed into a uniform thickness.

For the corrugated tube 13, as shown in FIG. 7, the adjacent protrusions 15 of the appropriate section 10a on an inward side with respect to said desired direction are welded together so that the appropriate section 10a is bent in said desired direction in a non-restorable fashion. Thus, for the corrugated tube 13, the adjacent protrusions 15 of the appropriate section 10a on the inward side with respect to said desired direction are attached to each other. In this embodiment, the protrusions 15 of the appropriate section 10a on the inward side with respect to said desired direction are heated, melted and attached to each other, and then cooled and cured and welded to each other.

Figure 4:
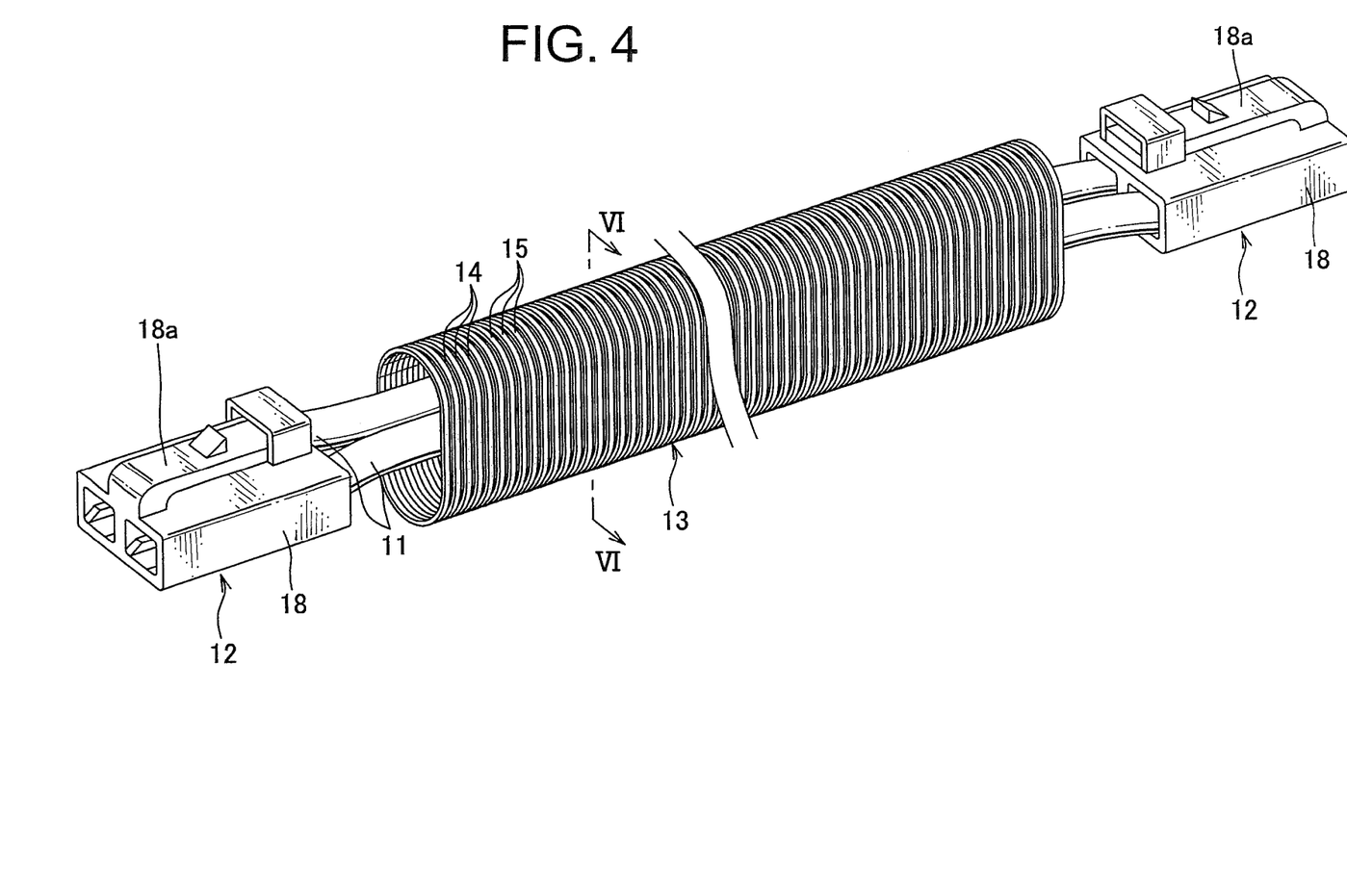
FIG. 4 is a perspective view of the corrugated tube in which the electric wire is received.

The wire harness 10 having the above-described structure is assembled as explained below. Firstly, as shown in FIG. 3, the terminal clamps 19 are attached to both ends of the electric wire 11, and the terminal clamp 19 attached to one end is received in the connector housing 18. Then, as shown in FIG. 4, the other end of the electric wire 11 is passed through the linearly-extending corrugated tube 13, followed by receiving the terminal clamp 19 attached to the other end in the connector housing 18. By doing so, the electric wires 11 are received in the linear corrugated tube 13.

Figure 5:
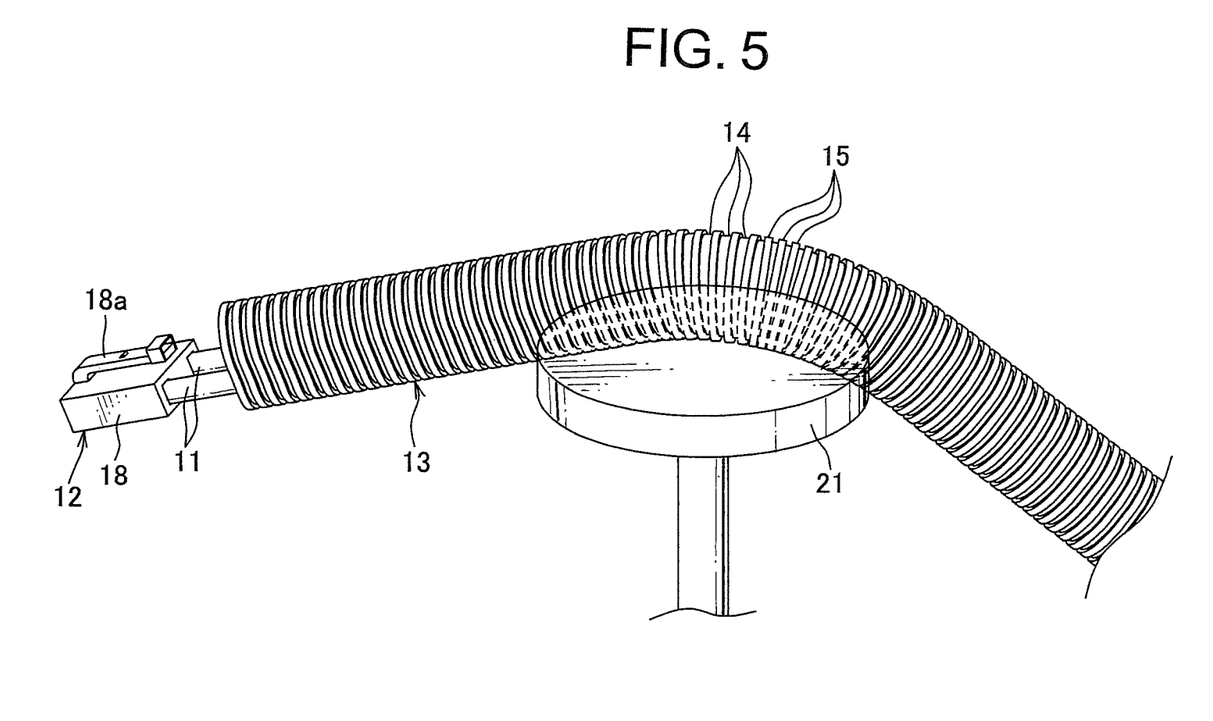
FIG. 5 is a perspective view of the corrugated tube being bent at an appropriate section of the corrugated tube in a desired direction.

Next, as shown in FIG. 5, the inward side of the appropriate section 10a of the corrugated tube 13 with respect to said desired direction is pushed against an outer periphery of a heated circular-plate-shaped shaping jig 21 made of metal, thereby bending the appropriate section in said desired direction. Then, the protrusions 15 made of thermoplastic resin and located on the appropriate section 10a of the corrugated tube 13 on the inward side with respect to said desired direction are heated and melted. Thus, the adjacent protrusions 15 are adhered to each other, thereby bending the appropriate section 10a in said desired direction. After that, the appropriate section 10a of a tube body 19 of the corrugated tube 13 is moved away from the outer periphery of the shaping jig 21 and cooled and cured.

By doing so, the appropriate section 10a of the tube body 19 of the corrugated tube 13 is bent in said desired direction in a non-restorable fashion. Thus, the wire harness 10 is assembled by receiving the electric wire 11 in the linear corrugated tube 13, attaching together the adjacent protrusions 15 of the appropriate section 10a of the linear corrugated tube 13 on the inward side with respect to said desired direction, followed by bending the appropriate section 10a in said desired direction in a non-restorable fashion. The wire harness 10 assembled in a manner as described above is then wired in the automobile 1 by fitting the connector 12 to the connectors of the battery 5 and the inverter 4 while attaching the corrugated tube 13 to the lower face of the vehicle frame P.

According to this embodiment, the appropriate section 10a of the corrugated tube 13 which is arranged to be bent when wired in the automobile 1 is bent in a non-restorable fashion in the direction in which the appropriate section 10a is bent when wired in the automobile 1. Thus, there is almost no need to perform another bending of the appropriate section 10a when wiring it in the automobile 1. Consequently, the number of the wiring clips and the protectors can be reduced, thereby preventing an increase in number of components. Furthermore, since there is almost no need to perform another bending when wiring the wire harness in the automobile 1, the electric wire 11 is not required to be formed longer than a necessary length. The necessary length corresponds to a length of a wiring path for connecting the electronic devices mounted on the automobile 1 such as the battery 5 and the inverter 4 to each other.

Furthermore, since the adjacent protrusions 15 of the appropriate section 10a on the inward side with respect to the said desired direction are attached to each other, the appropriate section 10a of the corrugated tube 13 can reliably be bent in said desired direction in a non-restorable fashion. Thus, the electric wire 11 is not required to be formed longer than necessary, and an increase in number of components can be prevented.

Furthermore, since the adjacent protrusions 15 of the appropriate section 10a of the corrugated tube 13 on the inward side with respect to said desired direction are welded together, the appropriate section 10a of the corrugated tube 13 can reliably be bent in said desired direction in a non-restorable fashion. Thus, the electric wire 11 is not required to be formed longer than necessary, and an increase in number of components can be prevented.

In the embodiment described above, the corrugated tube 13 and the electric wire 11 are not fixed to each other by a wire harness tape and such wound around outer peripheries of the corrugated tube 13 and the electric wire 11. Thus, the relative position of the corrugated tube 13 and the electric wire 11 is not restricted. Consequently, when the appropriate section 10a is bent in the above-mentioned desired direction, even if the electric wire 11 has an extra length, this extra length can be absorbed by appropriately adjusting the bending of the electric wire 11 at the appropriate section 10a.

Figure 8:
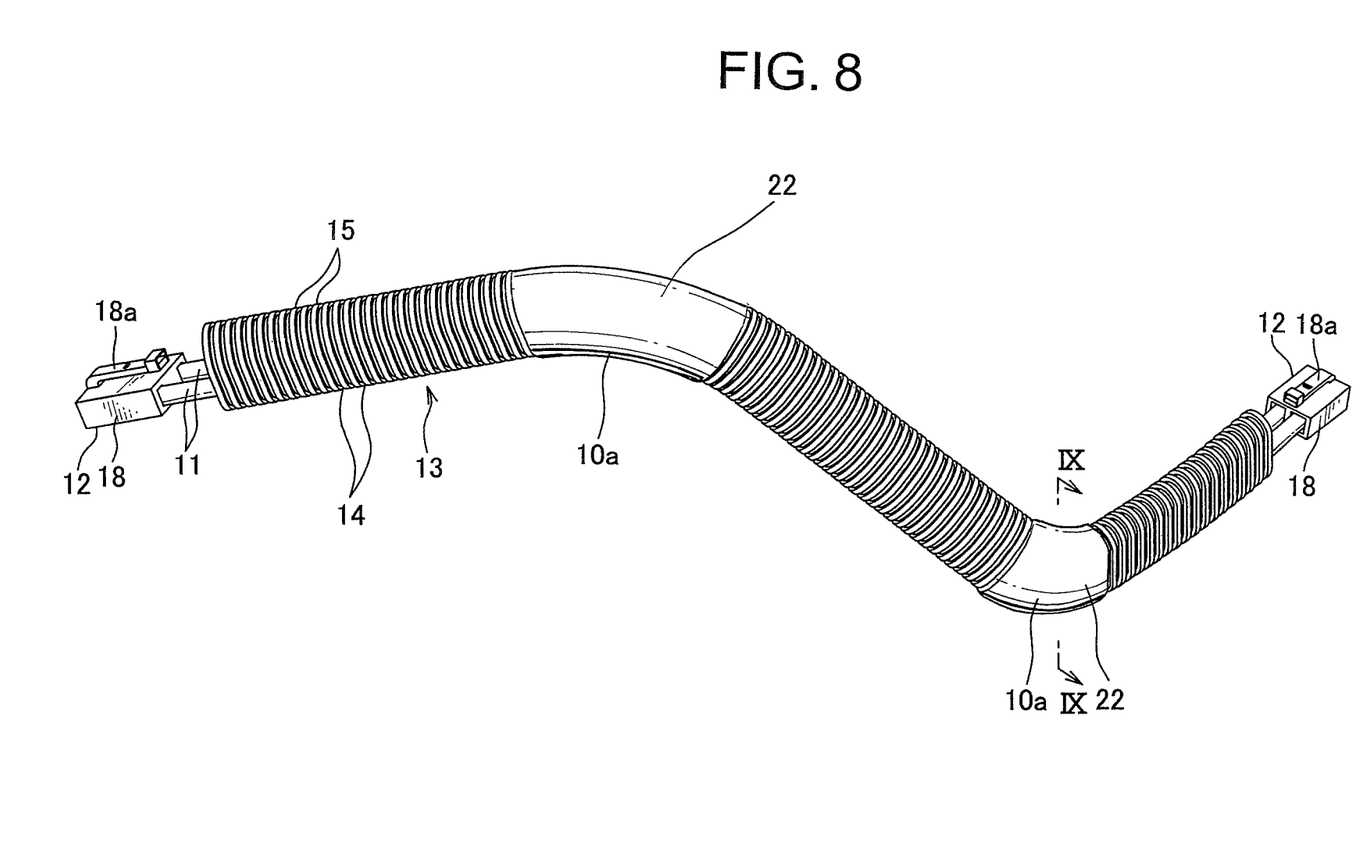
FIG. 8 is a perspective view of a wire harness according to a second embodiment of the present invention.

Next, a wire harness 10 according to a second embodiment of the present invention is explained in reference to FIGS. 8 and 9. In this embodiment, the same components as the first embodiment are indicated by the same reference signs to omit the explanation.

In this embodiment, an appropriate section 10a is bent in the above-mentioned desired direction, followed by adhering adjacent protrusions 15 of the appropriate section 10a on an inward side with respect to the above-mentioned desired direction using a well-known adhesive. In other words, the appropriate section 10a which is bent in said desired direction is fixed by an adhesive 22. Therefore, in this embodiment, the adjacent protrusions 15 of the appropriate section 10a on the inward side with respect to said direction are adhere to each other using the well-known adhesive, thereby bending the appropriate section 10a in a non-restorable fashion in said desired direction. The adhesive 22 may include various adhesives such as thermoplastic or thermoset synthetic resin, a reactive adhesive, a quick-drying glue and a hot-melt adhesive.

In addition to the advantageous effects of the first embodiment described above, in this embodiment, since the adjacent protrusions 15 of the appropriate section 10a of the corrugated tube 13 on the inward side with respect to said direction are adhered to each other by the adhesive 22, the appropriate section of the protection member can reliably be bent in said desired direction in a non-restorable fashion. Thus, there is no need to form the electric wire 11 longer than necessary, and an increase in number of components can be prevented.

In the embodiments described above, the corrugated tube 13 and the electric wire 11 are not fixed to each other by the wire harness tape and such wound around the outer peripheries of the corrugated tube 13 and the electric wire 11. However, in the present invention, the wire harness tape may be wound around the outer peripheries of the corrugated tube 13 and the electric wire 11 to fix them to each other. Furthermore, although the corrugated tube 13 of the above-described embodiments is not provided with a slit extending along the longitudinal direction, in the present invention, the corrugated tube 13 may be provided with the slit extending along the longitudinal direction, so that the electric wire 11 may be received in the corrugated tube 13 by opening the slit and elastically deforming the corrugated tube 13. Moreover, in the present invention, the wire harness 10 may connect the electronic devices other than the battery 5 and the inverter 4, i.e. the wire harness 10 may be used for transmitting a signal. Moreover, the wire harness 10 may include more than two electric wires 11.

Furthermore, the above-described embodiments are only representative embodiments of the present invention, and the present invention is not limited to these embodiments. That is, the embodiments can be modified and performed in various ways without departing from the scope of the present invention.

REFERENCE SIGNS LIST 1 automobile
10 wire harness
10a appropriate section
11 electric wire
13 harness tube, corrugated tube (protection member)
14 recessed groove
15 protrusion
22 adhesive

The invention claimed is:

1. A method for manufacturing a wire harness, the wire harness having at least one electric wire and a tubular protection member made of synthetic resin and arranged to receive the at least one electric wire to protect the electric wire, wherein the protection member is arranged to be bent at an appropriate section when wired on an automobile, and wherein the protection member has an outer surface including circumferentially-extending recessed grooves and circumferentially-extending protrusions which are arranged alternately along a longitudinal direction of the protection member so as to form the outer surface of the protection member into a concertina shape, the method comprising steps of:
receiving the electric wire in the protection member in a linear state;
attaching the adjacent protrusions of the appropriate section of the protection member in the linear state on an inward side with respect to a direction in which the appropriate section is bent when wired in the automobile to each other; and
pushing only the inward side of the appropriate section against an outer periphery of a heated circular-plate-shaped shaping jig, thereby bending the appropriate section of the protection member in said direction in a non-restorable fashion.

2. The method according to claim 1, wherein the step of attaching the adjacent protrusions includes welding the adjacent protrusions on the appropriate section, thereby bending the protection member in said direction in a non-restorable fashion.

3. The method according to claim 1, wherein the step of attaching together the protrusions includes adhering the adjacent protrusions on the appropriate section using an adhesive, thereby bending the protection member in said direction in a non-restorable fashion.

* * * * *